(No Model.) 3 Sheets—Sheet 1.
J. G. MOLE.
GRINDING MILL.
No. 603,064. Patented Apr. 26, 1898.
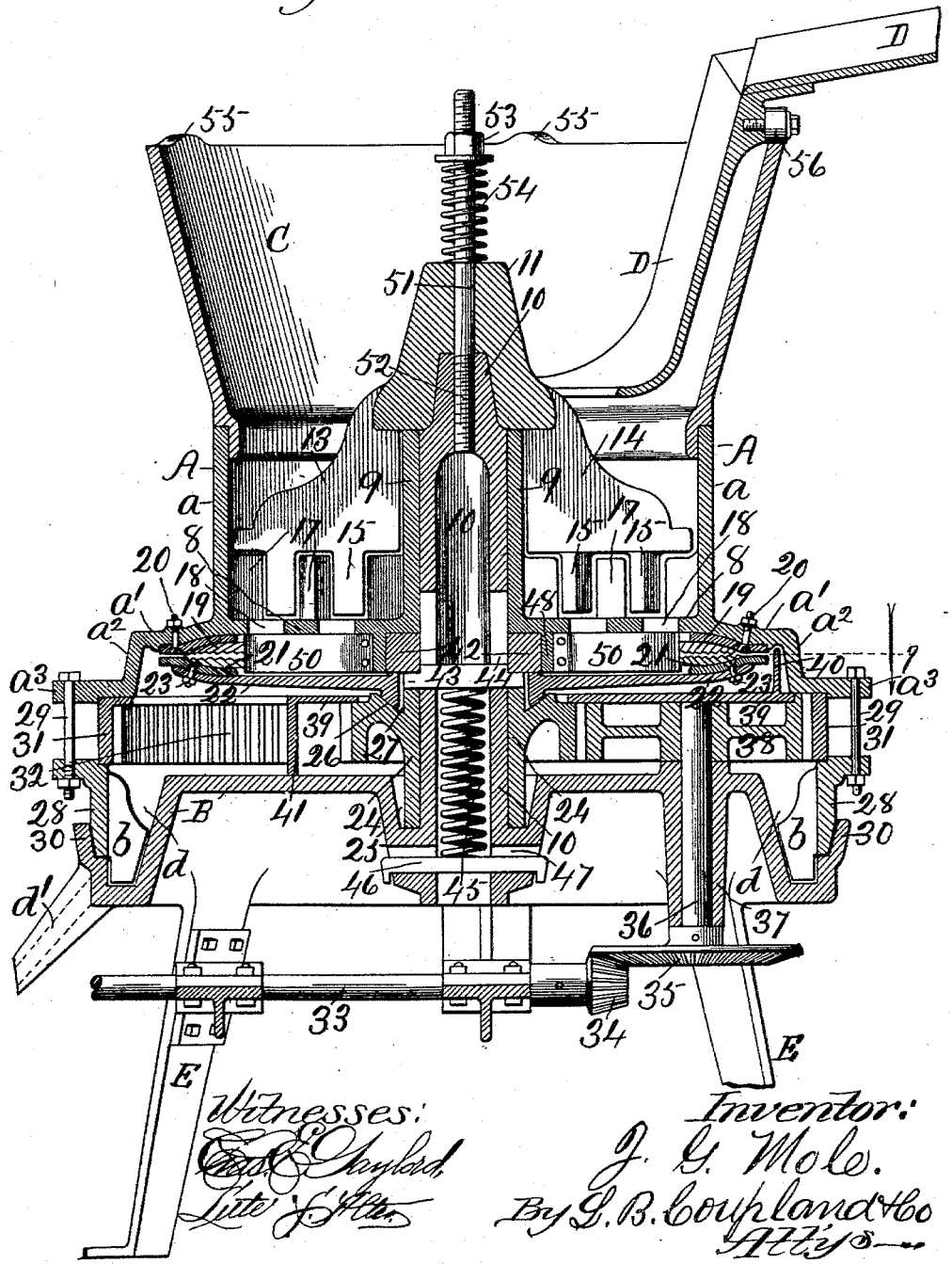
Witnesses:
Inventor:
J. G. Mole.
By G. B. Coupland & Co
Att'ys (No Model.) 3 Sheets—Sheet 2.
J. G. MOLE.
GRINDING MILL.
No. 603,064. Patented Apr. 26, 1898.
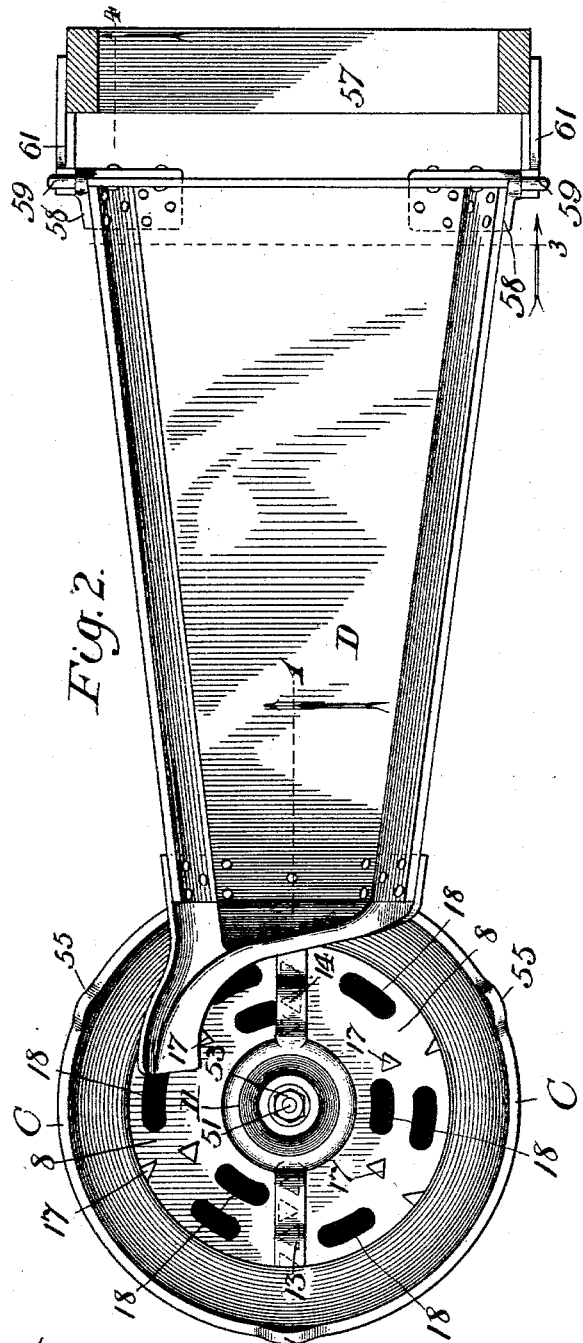
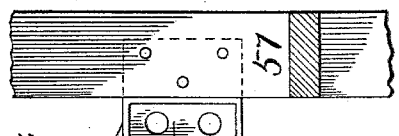
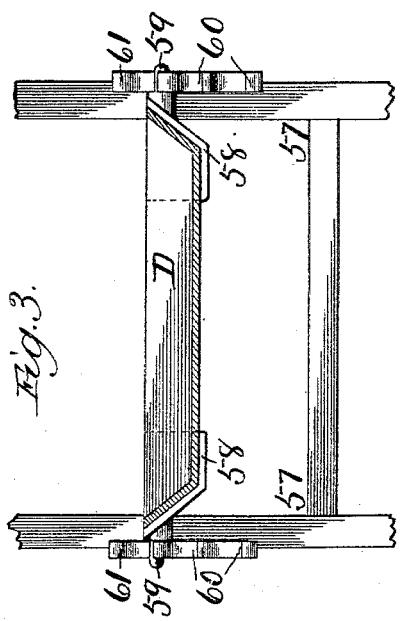
Witnesses:
Inventor:
J. G. Mole.
By L. B. Coupland & Co
Att'ys (No Model.)  3 Sheets—Sheet 3.
J. G. MOLE.
GRINDING MILL.
No. 603,064.  Patented Apr. 26, 1898.
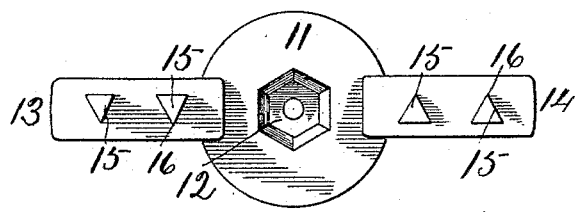
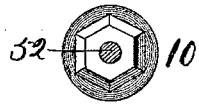
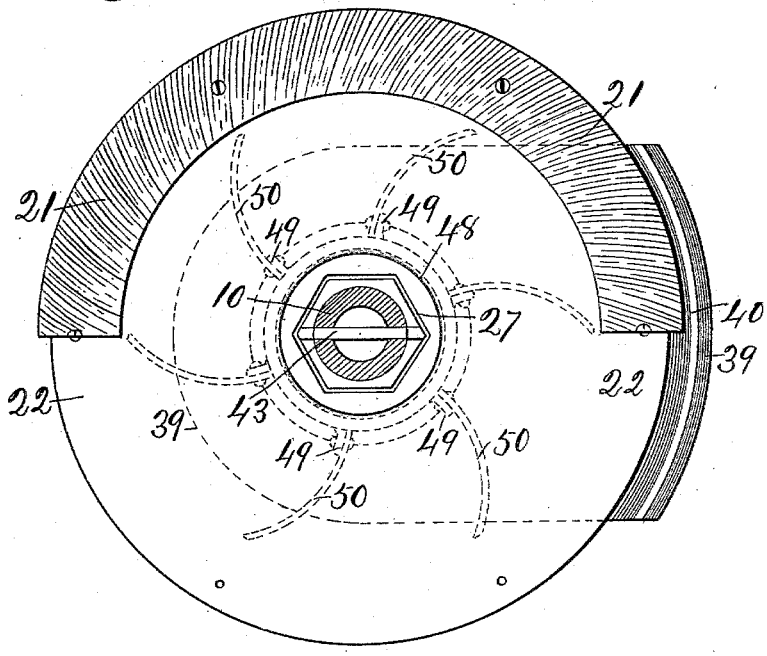
Witnesses:  Inventor:
 J. G. Mole.
By L. B. Coupland & Co.
Att'ys

UNITED STATES PATENT OFFICE.

JOHN G. MOLE, OF BATAVIA, ILLINOIS.

GRINDING-MILL.

SPECIFICATION forming part of Letters Patent No. 603,064, dated April 26, 1898.

Application filed August 20, 1896. Serial No. 603,335. (No model.)

*To all whom it may concern:*

Be it known that I, JOHN G. MOLE, a citizen of the United States, residing at Batavia, in the county of Kane and State of Illinois, have invented certain new and useful Improvements in Grinding-Mills; and I do hereby declare the following to be a full, clear, and exact description of the invention, such as will enable others skilled in the art to which it appertains to make and use the same.

This invention relates to improvements in that class of grinding-mills that are more especially adapted for the use of farmers in grinding feed, and has for its object to provide an apparatus of this character combining with other improvements a feature for breaking up and grinding corn in the ear, as will be hereinafter set forth.

Under the ordinary mill arrangement it is not possible to successfully grind the corn and cob together, as the cobs, being lighter, collect on the top of the body of corn and choke up the hopper and feed-passages. This improvement provides an arrangement for breaking up the cobs and forcing them along with the corn into the grinding-chamber.

Figure 1 is a vertical section of a mill apparatus embodying my improvement on line 1, Fig. 2, looking in the direction indicated by the arrow; Fig. 2, a plan or top view; Fig. 3, a transverse section on line 3, Fig. 2; Fig. 4, a broken-away longitudinal section on line 4, Fig. 2; Fig. 5, a detached bottom view of the cob-breaking attachment and holding-cap. Fig. 6 is a plan or top view of the stationary spindle; Fig. 7, a horizontal section on line 7, Fig. 1.

A represents the upper part of the inclosing cylindrical revoluble casing; B, the lower stationary base part; C, the hopper, mounted upon the revoluble casing and rotating therewith; D, the feed-spout attachment, and E the supporting-legs.

The casing A consists of the vertical part $a$, the outwardly-extending horizontal part $a'$, the downwardly-inclined part $a^2$, and the horizontal flange $a^3$. Interiorly this casing is provided with a diaphragm 8 and a central vertical bearing-sleeve 9, all formed integral.

The stationary base B is provided with an integral vertical stationary axial spindle 10, which extends up on the inside of the sleeve 9 and ends above the same, as shown in Fig. 1. This stationary spindle forms a central axis for the revoluble casing and parts attached thereto. The upper end of spindle 10 is of a hexagon shape in cross-section, Fig. 6, and forms a close-fitting seat for the cap 11, Figs. 1 and 5, provided with a corresponding recess 12. This cap is provided on opposite sides with laterally and downwardly projecting companion arms 13 and 14, which are in turn provided on the under side with a number of breaker-teeth 15, extending downwardly therefrom and stopping short of diaphragm 8. These teeth are preferably triangular in cross-section, so as to present the sharp cutting or breaking edges 16. The diaphragm is provided on its upper side with a number of correspondingly-shaped teeth 17, spaced about on circles intermediate of the circles on which the breaker-teeth 15 are set and concentric therewith, so that the two sets of teeth are intercurrent, and the moving teeth will pass or clear the stationary teeth in working. The diaphragm is provided with a number of openings 18, through which the material being ground passes to the grinding-rings.

The upper grinding-ring 19 is removably secured to the horizontal part $a'$ of the casing by means of a number of bolts 20. The lower grinding-ring 21 is secured to the rotatable carrier 22 by a number of bolts 23, Figs. 1 and 7.

A driving gear-wheel 24 is loosely mounted on spindle 10 and is provided with a step-bearing in the recess 25 in the base-support. The upper hub end of gear-wheel 24 is cut out to provide the beveled engaging bearing-surface 26. The hub of the carrier 22 is provided with a correspondingly-beveled surface and rests loosely in the seat formed in the hub, leaving an annular space 27 for the self-centering of the carrier and the retaining of the lower grinding-ring in a true position with reference to the upper ring when in operation. The carrier and its grinding-ring are rotated by the friction contact of gear-wheel 24. A ring 28 is secured to the casing by a number of bolts 29 and rotates therewith. The lower edge of this ring seats down inside of the annular rim 30, formed on the base part.

The ring 28 is provided on the inner side with a number of wings or sweepers $b$, which carry the ground material deposited in the annular chamber $d$ to the discharge-spout $d'$.

A hubless or rim gear-wheel 31 has teeth 32 formed on the inner circumferential surface and is rigidly clamped in place between the casing and ring 28 and transmits the required rotary motion to the same.

The horizontal driving-shaft 33 is provided with suitable bearings and has a pinion 34 mounted on the inner end thereof. This pinion engages with a gear-wheel 35, mounted on the lower end of a vertical counter-shaft 36, provided with a bearing 37 in the base. A gear-wheel 38 is mounted on the upper end of this counter-shaft and is adapted to engage with both of the gear-wheels 24 and 31, rotating them in opposite directions and transmitting a corresponding motion to the grinding-rings, both being runners. A plate 39 covers the gear-wheels and prevents the ground material from getting into and clogging a free movement or working of the same. This plate is of the shape and dimensions indicated by dotted lines in Fig. 7 and is provided on the outer edge and upper side with a wall 40, which prevents the material discharged by the rings from working down between the gear-wheels. The inner end of this plate is provided with a downwardly-projecting rim 41, which rests on the base and supports the inner end in place.

The inner edge of the diaphragm 8 and the lower integral end of sleeve 9 rest on a ring 42, which in turn rests on the notched-out ends of a cross-bar 43, inserted through a slot 44 in the hollow spindle. This cross-bar is supported up in its close bearing position by a powerful coiled spring 45, inserted upon the inner side of the hollow spindle, the lower end bearing on a cross-bar 46, inserted through a slot 47 in the base, as shown in Fig. 1.

An annulus 48 is formed on the under side of diaphragm 8 and incloses ring 42. This annulus extends down into the space or chamber between the grinding-rings and has a number of lugs 49 formed thereon, to which is secured the inner ends of a number of curved feed-arms 50, disposed at intervals, as shown in Fig. 7. The outer ends of these curved arms stop just short of the grinding-rings. These arms force the material to be ground onto the grinding-surfaces and prevent the accumulation of cob particles in the center.

A rod 51 is inserted down through cap 11 and screw-threaded into the upper end of axial spindle 10, as at 52. The upper end of this rod is also screw-threaded and an adjusting-nut 53 mounted thereon. A spring 54 is coiled on this rod between the cap 11 and nut 53. By means of the springs 45 and 54 the proper relative position of the grinding-rings is maintained, and if any foreign substance gets into the grinding-chamber these springs will yield sufficiently to let it pass through without injury.

The top edge of the hopper is provided with a number of ridges 55, disposed at intervals. The feed-spout has a friction bearing-roller 56, Fig. 1, journaled in the under side thereof, which rests on the edge of the hopper, and as it comes in contact with the ridges imparts the necessary feeding vibration to the spout.

The rear end of the feed-spout is adjustably supported on a frame 57, Figs. 2, 3, and 4. Companion plates 58 are secured to this end and respective sides of the spout and are provided with projecting pins 59, which are adapted to loosely engage with the series of notches 60 in the edges of companion bracket-plates 61. This provides for the adjustment of the rear end of the feed-spout in a higher or lower plane, so as to increase or diminish the incline thereof and vary the feed accordingly.

Having thus described my invention, what I claim as new, and desire to secure by Letters Patent, is—

1. In a grinding-mill, the combination with a revoluble casing, provided with a perforated diaphragm having breaker-teeth and a vertical bearing-sleeve formed integral therewith, of a base part, provided with a hollow stationary axial spindle extending up through said sleeve on the diaphragm, and a cap, mounted on said spindle and having laterally-projecting arms provided with breaker-teeth, arranged parallel to the corresponding teeth on said diaphragm, substantially as described.

2. In a grinding-mill, the combination with a revoluble casing, of the upper grinding-ring, secured thereto, a rotatable carrier, the lower grinding-ring, secured to said carrier, the hollow axial spindle, a driving gear-wheel, loosely mounted thereon and having a frictional engagement with said carrier, and means for transmitting motion to said gear-wheel, substantially as described.

3. In a grinding-mill, the combination with a revoluble casing, of a ring, the lower edge of which extends down into the base part, and is connected to the lower flanged edge of said casing by a number of bolts and leaving a space between, a hubless gear-wheel clamped in between the casing and ring and filling said space, the wings, secured to said ring, and means, for transmitting motion to said hubless gear-wheel, substantially as described.

4. In a portable mill, the combination with the revoluble casing and its perforated diaphragm, of a vertical sleeve, an axial spindle, a ring 42, a cross-bar on which said ring rests, and a spring, bearing against the under side of said cross-bar, substantially as described.

5. In a grinding-mill, the combination with a perforated diaphragm, having an annulus formed on the under side thereof, of the grinding-rings, and the feed-arms, secured at their inner ends to said annulus, the outer ends stopping short of the edges of the grinding-rings, substantially as described.

6. In a grinding-mill, the combination with a revoluble hopper, provided around its upper edge with a number of ridges, of a feed-spout, and a friction-roller, journaled in said spout and adapted to have contact with said ridges, substantially as described.

In testimony whereof I affix my signature in presence of two witnesses.

JOHN G. MOLE.

Witnesses:
L. M. FREEMAN,
L. B. COUPLAND.